United States Patent [19]

Doi et al.

[11] Patent Number: 5,015,714

[45] Date of Patent: May 14, 1991

[54] HEPTADIENE POLYMER AND PROCESS FOR PRODUCING THE SAME

[75] Inventors: Yoshiharu Doi, Kanagawa; Satoshi Ueki; Hiroyuki Furuhashi, both of Saitama, all of Japan

[73] Assignee: Tonen Corporation, Tokyo, Japan

[21] Appl. No.: 493,067

[22] Filed: Mar. 14, 1990

[30] Foreign Application Priority Data

Mar. 28, 1989 [JP] Japan .................................. 1-73984

[51] Int. Cl.$^5$ .......................... C08F 136/20; C08F 4/68
[52] U.S. Cl. .................. 526/336; 526/169.2; 526/335
[58] Field of Search ...................... 526/336, 169.2, 335

[56] References Cited

U.S. PATENT DOCUMENTS 3,984,610 10/1976 Elston ............................. 526/336 X
4,695,557 9/1987 Suzuki et al. ................. 526/169.2 X

FOREIGN PATENT DOCUMENTS 0311299 4/1989 European Pat. Off. ............ 526/336
998690 7/1965 United Kingdom ................ 526/336

*Primary Examiner*—Joseph L. Schofer
*Assistant Examiner*—F. M. Teskin
*Attorney, Agent, or Firm*—M. B. Kurtzman

[57] ABSTRACT

A heptadiene polymer comprising the repeating units

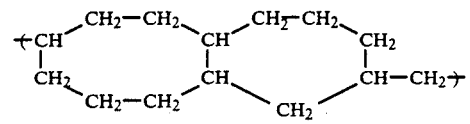

and having a number-average molecular weight of 2,000-500,000.

2 Claims, 2 Drawing Sheets

HEPTADIENE POLYMER AND PROCESS FOR PRODUCING THE SAME

BACKGROUND OF THE INVENTION

Field of industrial application

The present invention relates to new polymers of 1,6-heptadiene and a process for producing the same.

2. Prior art

It is known that 1,6-heptadiene can be polymerized by the aid of a catalyst composed of titanium tetrachloride and triisobutyl aluminum. (See Journal of American Chemical Society, vol. 80, p. 1740, [1958].) The thus obtained polymer is composed mainly of methylene groups and 6-membered rings arranged alternately and partly of carbon-carbon double bonds (4–10%).

PROBLEMS TO BE SOLVED BY THE INVENTION

Up to now, polymers of 1,6-heptadiene composed of 7-membered rings, 8-membered rings, and methylene groups joined together have not been disclosed.

It is an object of the present invention to provide a new polymer of 1,6-heptadiene which is composed of 7-membered rings, 8-membered rings, and methylene groups joined together.

MEANS TO SOLVE THE PROBLEMS

The present inventors found that the object of the present invention is achieved by polymerizing 1,6-heptadiene at a low temperature below $-50°$ C. in the presence of a catalyst composed of a vanadium chelate compound and an organoaluminum compound, said catalyst being known to be effective for the homogeneous polymerization of propylene or ethylene. The present invention was completed on the basis of this finding.

The process of the present invention employs a vanadium compound represented by the general formula given below.

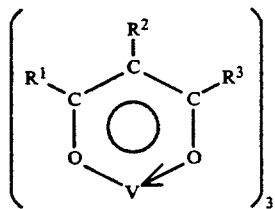

(where $R^1$, $R^2$, and $R^3$ are defined as above.) The vanadium compound represented by the general formula above will be explained with reference to the following examples.

Those in which $R^2$ is a hydrogen atom and $R^1$ and $R^3$ are hydrocarbon atoms.

$R^1/R^3$: $CH_3/CH_3$, $CH_3/C_2H_5$, $C_2H_5/C_2H_5$, $CH_3/C_6H_5$, $C_2H_5/C_6H_5$, $C_6H_5/C_6H_5$, $CH_3/C_6H_5CH_2$, $C_6H_5CH_2/C_6H_5CH_2$, $C_2H_5/C_6H_5CH_2$, and $C_6H_5/C_6H_5CH_2$.

Those in which $R^2$ is a hydrocarbon group and either of $R^1$ and $R^3$ is a hydrogen atom, with the other being a hydrocarbon group.

$R^2/R^1$ or $R^3$ : $CH_3/CH_3$, $C_2H_5/CH_3$, $CH_3/C_2H_5$, $C_2H_5/C_2H_5$, $C_6H_5/CH_3$, $CH_3/C_6H_5$, $C_6H_5/C_2H_5$, $C_2H_5/C_6H_5$, $C_6H_5/C_6H_5$, $C_6H_5CH_2/CH_3$, $CH_3/C_6H_5CH_2$, $C_6H_5CH_2/$ $C_6H_5CH_2$, $C_6H_5CH_2/C_2H_5$, $C_2H_5/C_6H_5CH_2$, $C_6H_5CH_2/C_6H_5$, and $C_6H_5/C_6H_5CH_2$.

Those in which $R^2$ is a hydrogen atom and either of $R^1$ and $R^3$ is a hydrogen atom, with the other being a hydrocarbon group.

$R^1$ or $R^3$ : $CH_3$, $C_2H_5$, $C_6H_5$, and $C_6H_5CH_2$.

Preferable among the above-listed compounds are the following.

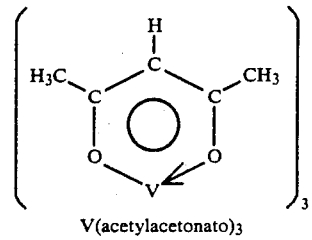

V(acetylacetonato)₃

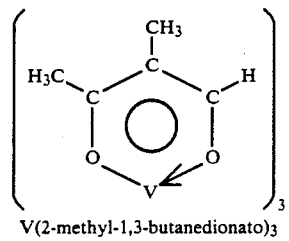

V(2-methyl-1,3-butanedionato)₃

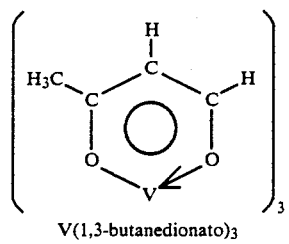

V(1,3-butanedionato)₃

(b) Organoaluminum compound

The organoaluminum compound is one which is represented by the general formula $R_nAlX_{3-n}$ (where R denotes an alkyl group or aryl group; X denotes a halogen atom or hydrogen atom; and n is an arbitrary number defined by $1 \leq n < 3$.) It is a compound, mixture, or complex compound of $C_{1-18}$ (preferably $C_{2-6}$) alkyl aluminum, such as dialkyl aluminum monohalide, monoalkyl aluminum dihalide, and alkyl aluminum sesquihalide. Dialkyl aluminum monohalide includes dimethyl aluminum chloride, diethyl aluminum chloride, diethyl aluminum bromide, diethyl aluminum iodide, diisobutyl aluminum chloride; monoalkyl aluminum dihalide includes methyl aluminum dichloride, ethyl aluminum dichloride, methyl aluminum dibromide, ethyl aluminum dibromide, ethyl aluminum diiodide and isobutyl aluminum dichloride; and alkyl aluminum sesquihalide includes ethyl aluminum sesquichloride.

The organoaluminum compound should be used in an amount of 1 to 1,000 mol for 1 mol of the vanadium compound.

POLYMERIZATION OF 1,6-HEPTADIENE

The polymerization of 1,6-heptadiene should preferably be carried out in a solvent which remains inert and liquid during the polymerization. Examples of such a solvent include propane, butane, pentane, hexane, heptane, and toluene. The polymerization temperature should be −50° C. or below. Especially, polymerization at −65° C. or below gives rise to a nearly monodisperse polymer having a molecular weight distribution of 1.05 to 1.4 (the ratio of $\overline{M}w$ (weight-average molecular weight) to $\overline{M}n$ (number-average molecular weight). The yield and molecular weight of the polymer will be proportional to the length of polymerization time.

According to the process of the present invention as mentioned above, there is obtained a Polymer which consists of the repeating units shown below and has a number-average molecular weight of 2,000 to 500,000 (in terms of styrene).

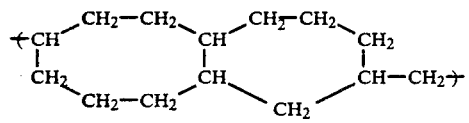

EFFECT OF THE INVENTION

The present invention makes it possible to produce a new polymer composed of 7-membered rings and 8-membered rings joined together at a 100% selectivity.

The polymer of the present invention is superior in moldability. In addition, it is amorphous and hence colorless and transparent, and has no polar groups and hence has a very low degree of water absorption and moisture absorption. Therefore, it will find use as a raw material of the substrate of information recording film.

EXAMPLE 1

In a 300-ml flask, with the atmosphere therein thoroughly replaced with nitrogen, was placed 30 ml of toluene, followed by cooling to −78° C. To the flask was added 50 mmol of 1,6-heptadiene at the same temperature. To the flask were further added a toluene solution containing 20 mmol of Al(C$_2$H$_5$)$_2$Cl and a toluene solution containing 1 mmol of V(acetylacetonato)$_3$. Polymerization was initiated with stirring. After polymerization for 4 hours at −78° C., the reaction mixture was brought into contact with 300 mL of HCl-ethanol mixture. The resulting polymer was washed five times with 300 ml of ethanol, followed by drying under reduced pressure at normal temperature.

Figure 1:
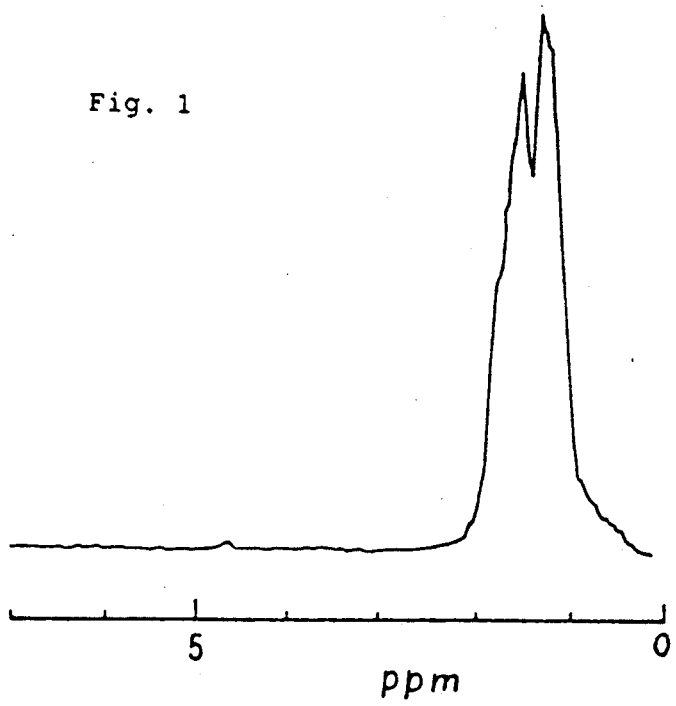
FIG. 1 and FIGS. 2(1) and 2(2) are NMR charts of the polymers obtained according to the present invention.
Figure 2:
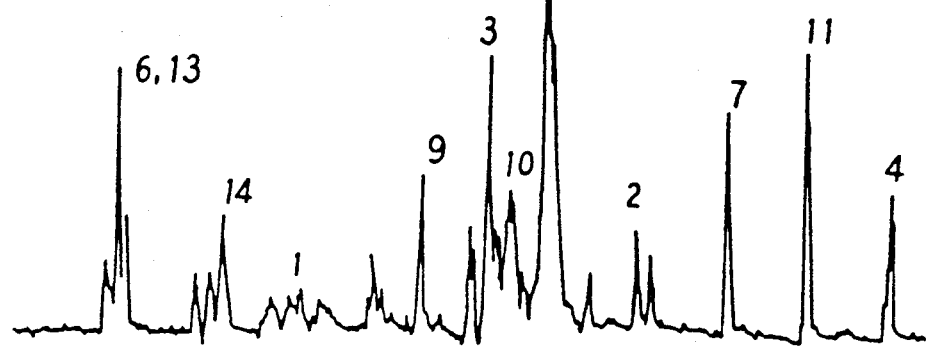
Figure 2:
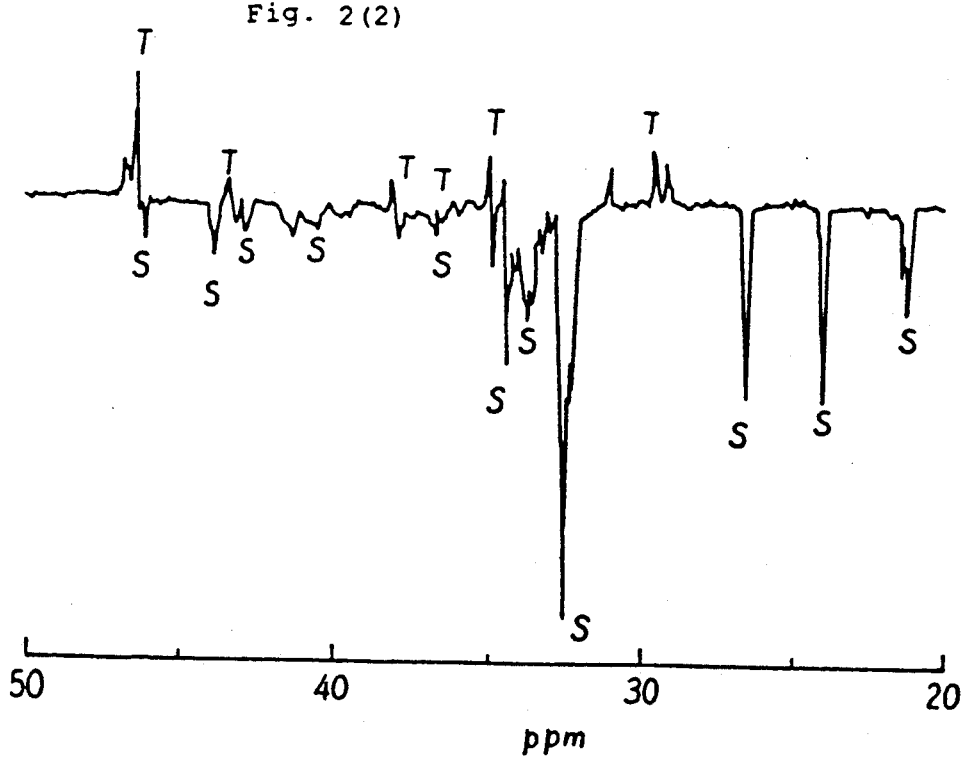

The resulting polymer was tested for molecular weight by GPC. It was found that $\overline{M}n = 27,600$ (in terms of styrene) and $\overline{M}w/\overline{M}n = 1.4$. In addition, this polymer gave a 100 MHz $^1$H-NMR spectrum as shown in FIG. 1. No peaks (4.5–6.6 ppm) assigned to the proton at the double bond are noticed. This indicates that this polymer has no double bonds. This polymer also gave a 125 MHz $^{13}$C-NMR spectrum as shown in FIG. 2(1) and an INEPT spectrum ($\Delta = \frac{3}{4}J$) as shown in FIG. 2(2). It is noted that the methylene carbon (T) is in phase and the methylene carbon (S) is out of phase. The spectrum in FIG. 2(1) was analyzed, with the CH-carbon and CH$_2$-carbon distinguished from each other by means of the INEPT spectrum, to establish the assignment as shown below.

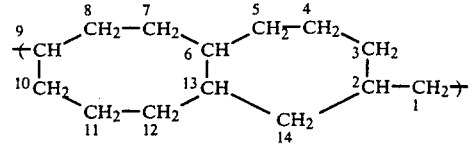

It is concluded from the foregoing that the thus obtained polymer is one whose main chain has a unique structure composed of the repeating units formed by a 7-membered ring and 8-membered ring joined together as shown below.

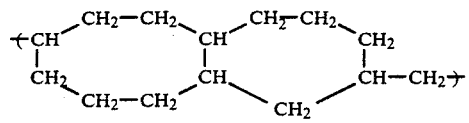

In addition, this polymer is considered amorphous in view of the fact that it gives no peaks attributable to the crystalline structure in the X-ray diffraction spectrum. It was also found from the results of DSC measurements that this polymer has a glass transition point of 39.1° C.

EXAMPLE 2

The polymerization of 1,6-heptadiene was carried out in the same manner as in Example 1, except that the polymerization time was changed to 6 hours. The results are shown in Table 1. The resulting polymer was found to have the same structure as that of the polymer in Example 1.

EXAMPLE 3

In a 500-ml flask, with the atmosphere therein thoroughly replaced with nitrogen, was placed 30 ml of toluene, followed by cooling to −60° C. To the flask was added 125 mmol of 1,6-heptadiene at the same temperature. To the flask were further added a toluene solution containing 10 mmol of Al(C$_2$H$_5$)$_2$Cl and a toluene solution containing 1 mmol of V(2-methyl-1,3-butanedionato)$_3$. Polymerization was initiated with stirring. After polymerization for 3 hours at −60° C., the reaction mixture was treated in the same manner as in Example 1. Thus there was obtained a polymer having the same structure as that of the polymer in Example 1. The results are shown in Table 1.

EXAMPLE 4

The polymerization of 1,6-heptadiene was carried out in the same manner as in Example 1, except that the V(acetylacetonato)$_3$ was replaced by V(1,3-butanedionato)$_3$, the amount of toluene was changed to 120 ml, the polymerization temperature was changed to −70° C., and the polymerization time was changed to 6 hours. The results are shown in Table 1.

TABLE 1

| Example No. | Yields (g/g-V atom) | $\overline{M}n$ (× 10$^3$) | $\overline{M}w/\overline{M}n$ |
|---|---|---|---|
| 1 | 47.7 | 27.6 | 1.4 |
| 2 | 31.8 | 19.9 | 1.3 |
| 3 | 149.2 | 58.5 | 1.4 |
| 4 | 54.9 | 31.3 | 1.4 |

We claim:

1. A heptadiene polymer comprising the repeating units

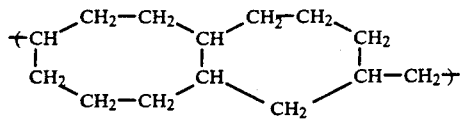

and having a number-average molecular weight of 2,000–500,000.

2. A process for producing a heptadiene polymer comprising the repeating units

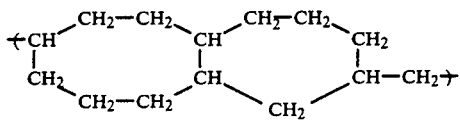

and having a number-average molecular weight of 2,000–500,000, said process comprising polymerizing 1,6-heptadiene at $-50°$ C. or below in the presence of a catalyst composed of a vanadium compound represented by the general formula

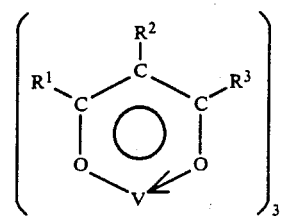

wherein $R^1$, $R^2$, and $R^3$ each denotes a hydrogen atom or a $C_{1-8}$ hydrocarbon group, provided that at least one of $R^1$, $R^2$, and $R^3$ should be a hydrogen atom but all of $R^1$, $R^2$, and $R^3$ should not be hydrogen atoms and an organoaluminum compound.

* * * * *